US008533927B2

(12) United States Patent
Atherton et al.

(10) Patent No.: US 8,533,927 B2
(45) Date of Patent: Sep. 17, 2013

(54) FULL-SCALE ARCHITECTURAL TEMPLATE AND METHOD FOR INSTALLING CONSTRUCTION ELEMENTS FOR EXHIBITIONS, TRADE SHOWS, CONVENTIONS AND EVENTS WITHOUT DAMAGING CARPET OR FLOOR

(75) Inventors: Jay Atherton, Southlake, TX (US); Brian West, Grapevine, TX (US); Eddie Crow, Grand Prairie, TX (US)

(73) Assignee: Freeman Capital Company, Las Vegas, NV (US)

( * ) Notice: Subject to any disclaimer, the term of this patent is extended or adjusted under 35 U.S.C. 154(b) by 328 days.

(21) Appl. No.: 12/904,321

(22) Filed: Oct. 14, 2010

(65) Prior Publication Data

US 2012/0090151 A1    Apr. 19, 2012

(51) Int. Cl.
*G01B 3/00* (2006.01)
(52) U.S. Cl.
USPC .............................................. 29/464; 33/562
(58) Field of Classification Search
USPC ............................................ 29/464; 33/562
See application file for complete search history.

(56) References Cited

U.S. PATENT DOCUMENTS

| | | | |
|---|---|---|---|
| 1,988,461 A | 1/1935 | Reeves | |
| 2,293,441 A | 8/1942 | Meyer | |
| 2,610,413 A | 9/1952 | Dasey | |
| 2,858,579 A | 11/1958 | Koelb | |
| 3,012,336 A | 12/1961 | Brown | |
| 3,378,963 A | 4/1968 | Obata | |
| 3,816,931 A * | 6/1974 | LaMar | ............................. 33/563 |
| 4,250,642 A * | 2/1981 | Riehle | ............................. 434/79 |
| 4,274,233 A | 6/1981 | Currier | |
| 4,573,302 A | 3/1986 | Caretto | |
| 4,652,239 A | 3/1987 | Brimberg | |
| 4,806,102 A | 2/1989 | Pedersen et al. | |
| 4,852,313 A | 8/1989 | Jones | |
| 4,902,229 A | 2/1990 | Pedersen et al. | |
| 5,141,437 A | 8/1992 | Fowlkes, Jr. | |
| 5,219,457 A | 6/1993 | Graves | |
| 5,601,431 A | 2/1997 | Howard | |
| 5,755,072 A * | 5/1998 | Lingafelter | .................. 52/741.1 |
| 5,775,033 A | 7/1998 | Meehan | |
| 5,819,498 A | 10/1998 | Geraci | |

(Continued)

FOREIGN PATENT DOCUMENTS

| | | | |
|---|---|---|---|
| JP | 4264591 A | 9/1992 | |
| JP | 4264591 A | 9/1992 | |

(Continued)

*Primary Examiner* — Peter DungBa Vo
*Assistant Examiner* — Anthony Green
(74) *Attorney, Agent, or Firm* — Gardere Wynne Sewell LLP

(57) ABSTRACT

A method of installing temporary construction elements for an event without damaging a floor is disclosed. The method includes creating a digital file of an architectural template illustrating the construction elements. The method further includes printing the digital file as a full-scale architectural template. The full-scale architectural template comprises one or more sheets capable of protecting the floor during installation of the temporary construction elements, each sheet being a portion of the full-scale template. The method further includes placing and aligning the sheets on the floor so that the markings are positioned in the same location as the corresponding temporary construction elements should be and attaching the sheets to the floor. The method further includes installing the temporary construction elements on the sheets in accordance with the markings. The method further includes removing the sheets after installation of the construction elements.

19 Claims, 3 Drawing Sheets

(56) References Cited

U.S. PATENT DOCUMENTS

| | | | |
|---|---|---|---|
| 5,950,319 A * | 9/1999 | Harris | 33/494 |
| 6,253,504 B1 | 7/2001 | Cohen et al. | |
| 6,834,438 B1 | 12/2004 | Heister | |
| D536,378 S | 2/2007 | Taff | |
| 7,373,731 B2 | 5/2008 | Nyberg | |
| 7,568,295 B1 | 8/2009 | Strain | |
| 2003/0061722 A1 | 4/2003 | Bradley | |
| 2003/0167649 A1 | 9/2003 | Gleeson | |
| 2005/0257391 A1 | 11/2005 | Driscoll | |
| 2005/0277093 A1 | 12/2005 | Kelly et al. | |
| 2006/0080901 A1 | 4/2006 | Wagner et al. | |
| 2006/0174557 A1 | 8/2006 | Kressin | |
| 2006/0265969 A1 | 11/2006 | Broderick | |
| 2007/0068114 A1 | 3/2007 | Caretto | |
| 2007/0190496 A1 * | 8/2007 | Lamb | 434/72 |
| 2008/0052941 A1 | 3/2008 | Nyberg | |
| 2008/0055554 A1 | 3/2008 | Tubin et al. | |
| 2009/0277031 A1 * | 11/2009 | Stocking | 33/562 |

FOREIGN PATENT DOCUMENTS

| | | |
|---|---|---|
| JP | 2003-34936 A | 2/2003 |
| JP | 2003034936 A | 2/2003 |
| JP | 2007171874 A | 7/2007 |

\* cited by examiner

FULL-SCALE ARCHITECTURAL TEMPLATE AND METHOD FOR INSTALLING CONSTRUCTION ELEMENTS FOR EXHIBITIONS, TRADE SHOWS, CONVENTIONS AND EVENTS WITHOUT DAMAGING CARPET OR FLOOR

BACKGROUND OF THE INVENTION

1. Field of the Invention

The invention relates generally to architectural templates and, more particularly, the invention relates to a full-scale architectural template and method for installing construction elements for exhibitions, trade shows, conventions and corporate events without damaging a carpet or a floor.

2. Description of the Related Art

Exhibitions, trade shows, conventions and other events are generally hosted in buildings capable of accommodating a large number of people. For these events, a building is typically sub-divided into many booths and other smaller meeting spaces. Construction elements such as walls and cabinets are assembled in designated locations to create the booths and other meeting spaces. Also, HVAC equipments, electrical and data services lines are installed and furniture is transported to designated locations.

A disadvantage of existing methods is during transportation of the construction elements, HVAC equipments, electrical and data services lines and furniture, a carpet or a floor can easily be damaged. A further disadvantage of existing methods is that the walls and cabinets are assembled directly on the carpet or on the floor, thereby damaging the carpet or the floor. A further disadvantage of existing methods is the exact locations for the booths and other construction elements are identified according to a floor-plan, which is time consuming.

SUMMARY

In one embodiment, the invention is a method of installing construction elements for an event without damaging a carpet. The method includes creating a digital file of an architectural template illustrating the construction elements for the event. The method further includes printing the digital file as a full-scale architectural template. The full-scale architectural template comprises one or more sheets capable of protecting the carpet during installation of the construction elements, each sheet being a portion of the full-scale architectural template. The sheets have markings indicating the position of the construction elements.

The method further includes placing and aligning the sheets on the carpet so that the markings are in the same location as the corresponding construction elements and attaching the sheets to the carpet. The method further includes installing the construction elements on the sheets in accordance with the markings. The construction elements are configured to be removed after the event and removing the sheets. The sheets may be made of vinyl, fabric, plastic, paper, or any other suitable material.

The method further includes adding identifiers on each sheet to aid in aligning the sheets during placement on the carpet. After installation of the construction elements, the sheets are removed by pulling the sheets out from under the construction elements. The sheets may be cut out using a sharp tool.

BRIEF DESCRIPTION OF THE DRAWINGS

For detailed understanding of the invention, reference is made to the following detailed description of the preferred embodiments, taken in conjunction with the accompanying drawings in which reference characters designate like or similar elements throughout the several figures of the drawings.

DETAILED DESCRIPTION OF THE EMBODIMENTS

In one embodiment, the invention is a method for protecting a carpet or a floor during installation of construction elements and during placement of furniture for an event. The event may be a convention, an exhibition, a trade show, a meeting, a conference or any other event requiring construction of a facility.

In another embodiment, the invention is a full-scale architectural template which protects a carpet or a floor during installation of construction elements and during placement of furniture. The construction elements may be booths, temporary walls, doors, cabinets, electrical cables, data services lines and HVAC equipments. The construction elements are generally configured to be removed after an event.

Figure 1A:
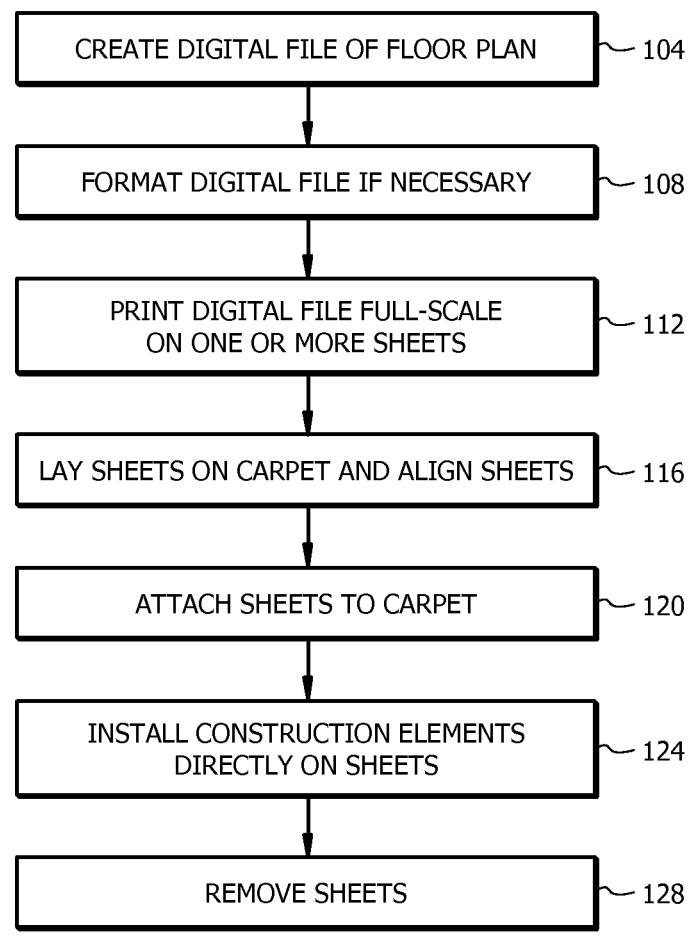
FIG. 1 is a flow diagram of the steps of installing construction elements in accordance with one embodiment of the invention.

FIG. 1 is a flow diagram of the steps of installing construction elements and for placing furniture for an event in accordance with one embodiment of the invention. In step 104, a digital file of an architectural template for the event is created. The digital file may be created using any commercially available computer aided design tool. The digital file alternatively may be created by scanning in a drawing of a floor plan. The architectural template illustrates the layout of the construction elements such as booths, temporary walls, doors, cabinets, utilities, data services lines as well as the location of furniture. If necessary, in step 108, the digital file may be converted to an appropriate format prior to printing.

In step 112, the digital file is printed full-scale on one or more sheets. The sheets may be made of paper, plastic, fabric, vinyl or other material suitable for application to the carpet or a floor. It is necessary that the sheets are flexible and possess required structural integrity to protect the carpet or the floor because the construction elements will be built directly on the sheets. The construction elements are represented by printed lines or other markings on the sheets.

In one implementation, the full-scale architectural template is printed onto a plurality of sheets, each being a portion of the architectural template. For example, the architectural template may be printed onto a plurality of 15 foot wide sheets, each containing a portion of the floor plan. Identifiers are added to the sheets to aid in aligning the sheets during placement on the carpet or the floor. Other markings such as grid lines may be printed on the sheets as background to aid in aligning the sheets during installation.

The sheets are transported to the event venue for installation on the carpet or the floor. In step 116, the sheets are laid on the carpet or the floor and are aligned using the identifiers. Since the construction elements are constructed directly on the sheets, it is necessary that the sheets are properly aligned so that the markings representing the construction elements are in the same location as the corresponding construction elements. In step 120, the sheets are attached or secured to the floor or the carpet and are also secured together by tapes or adhesives.

In step 124, the construction elements are built directly on the sheets in accordance with the markings. For example, booths, temporary walls, doors, and cabinets are built on the sheets in accordance with the markings. Also, furniture is moved to locations according to the markings. It will be appreciated that the sheets provide a protective cover to the carpet or the floor during the construction phase.

After the construction elements are built and the furniture is in place, in step 128, the sheets are removed from under the construction elements and the furniture. The sheets may be cut out using a sharp blade or a knife.

Figure 2:
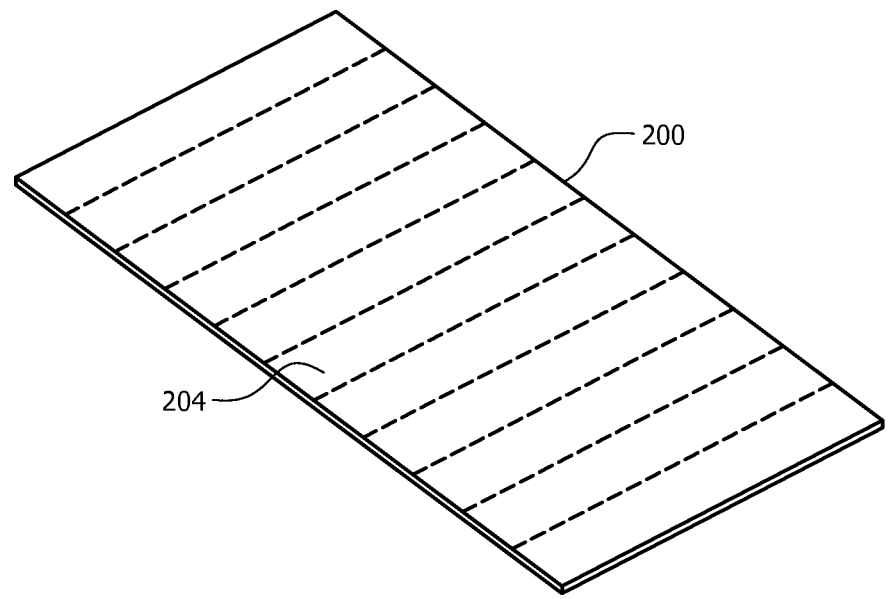
FIG. 2 illustrates a floor for an event.

FIG. 2 illustrates a floor 200 on which a carpet 204 is laid. Booths and other construction elements will be installed on the carpet 204 for an event. During installation of the booths and other construction elements, it is desirable to protect the carpet 204 from damage.

Figure 3:
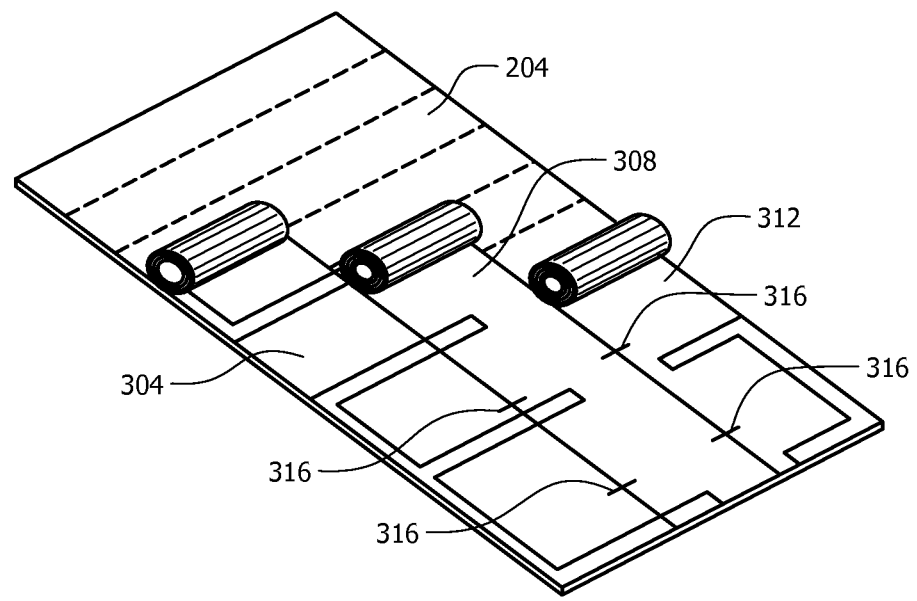
FIG. 3 shows a full-scale architectural template comprising a plurality of sheets being laid on a carpet.

FIG. 3 shows a full-scale architectural template comprising a plurality of sheets 304, 308 and 312 being laid on the carpet 204. The sheets are rolled out and laid on the carpet side by side. Adjacent sheets may overlap by a few inches. The sheets are then aligned with one or more points on the carpet and with identifiers 316. When the sheets are properly aligned, they are attached or secured to the carpet.

Figure 4:
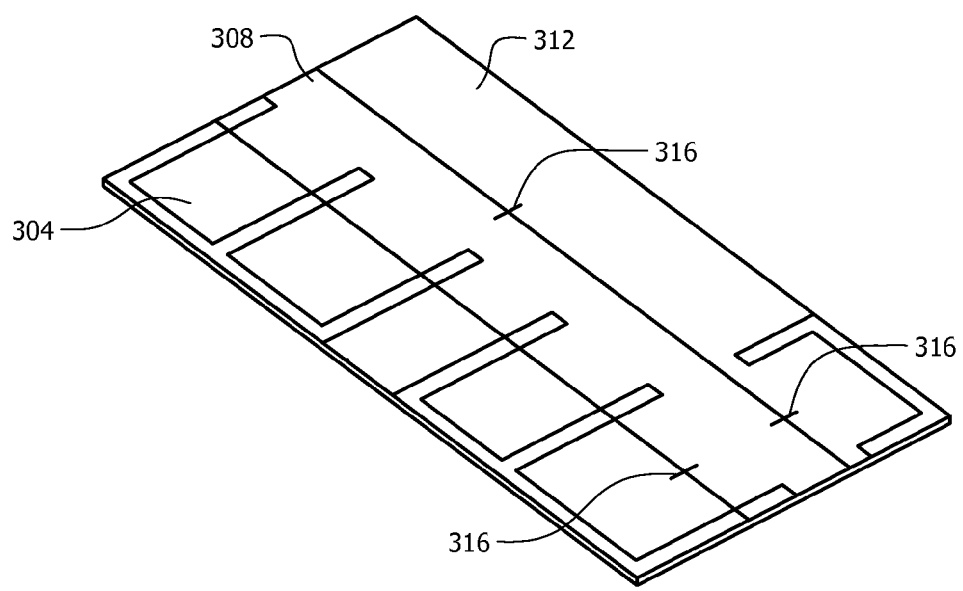
FIG. 4 shows a full-scale architectural template installed on a carpet.

FIG. 4 shows the sheets being completely installed on the carpet. As shown in FIG. 4, the sheets display lines and other markings indicating the position of the booths and other construction elements.

Figure 5:
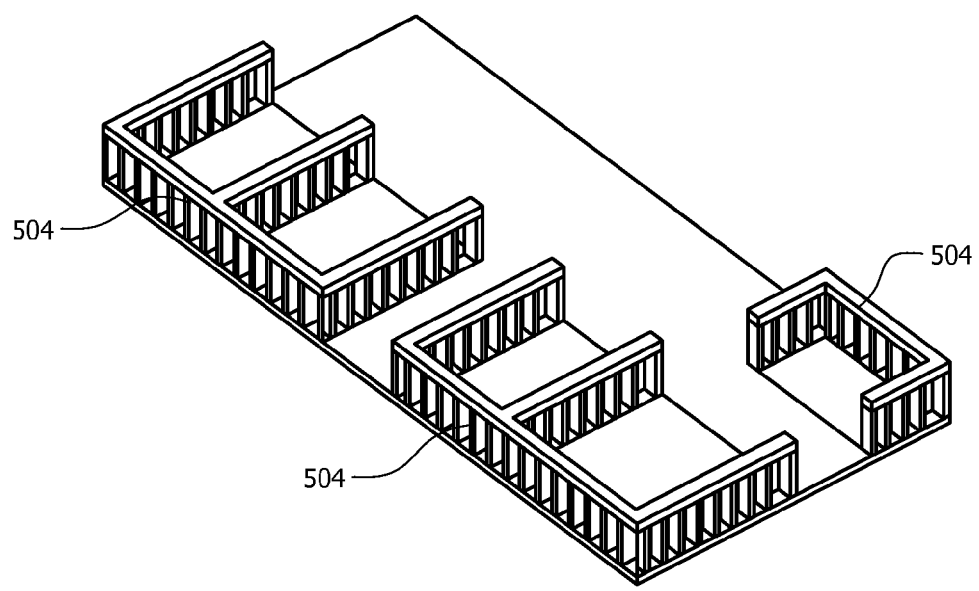
FIG. 5 shows booths being installed directly on sheets.

FIG. 5 shows booths 504 being installed directly on the sheets. The markings displayed on the sheets are used as guides during installation. When the sheets are no longer needed after the construction elements have been installed, the sheets are removed and discarded. The sheets may be cut out using a sharp blade or any other suitable tool.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in the following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A method of installing temporary construction elements for an event without damaging a carpet, the method comprising the steps of:
   creating a digital file of an architectural template illustrating the temporary construction elements for the event;
   then printing the digital file as a full-scale architectural template on one or more sheets, each sheet being a portion of the full-scale architectural template, the sheets having markings indicating the position of the temporary construction elements;
   then placing the sheets on top of the carpet, aligning the sheets on the carpet so that the markings are in the same location as the corresponding temporary construction elements, and removably attaching the sheets to the carpet;
   then installing the temporary construction elements on the sheets in accordance with the markings; and
   then uninstalling the temporary construction elements after the event.

2. The method according to claim 1, wherein the sheets are made of one or more of a vinyl material, a fabric and a plastic material.

3. The method according to claim 1, further comprising adding identifiers on each sheet to aid in aligning the sheets during placement on the carpet.

4. The method according to claim 1, wherein the sheets are removed by pulling the sheets out from under the temporary construction elements.

5. The method according to claim 1, wherein placing the sheets on top of the carpet comprises securing the sheets together.

6. The method of claim 1, wherein aligning the sheets on the carpet further comprises overlapping a portion of adjacent sheets.

7. The method of claim 1, further comprising adding grid lines to the sheets as a background to aid in aligning the sheets.

8. The method of claim 1, wherein the construction elements comprise portable furniture.

9. A method of installing temporary construction elements for an event without damaging a carpet, the method comprising the steps of:
   creating a digital file of an architectural template illustrating the temporary construction elements;
   printing the digital file as a full-scale architectural template on one or more sheets, each sheet being a portion of the architectural template, the sheets having markings indicating the position of the temporary construction elements, each sheet having identifiers to aid in aligning the sheets;
   placing and aligning the sheets on the carpet so that the markings are positioned in the same location as the corresponding temporary construction elements should be;
   removably securing the sheets to the carpet;
   then installing the temporary construction elements on the sheets in accordance with the markings; and
   then removing the temporary construction elements.

10. The method according to claim 9, wherein the sheets are made of one or more of a vinyl material, a fabric and a plastic material.

11. The method according to claim 9, wherein the sheets are removed by pulling the sheets out from under the temporary construction elements.

12. The method according to claim 9, wherein placing the sheets on the carpet comprises securing the sheets together.

13. The method of claim 8, wherein aligning the sheets on the carpet further comprises overlapping a portion of adjacent sheets.

14. The method of claim 8, further comprising adding grid lines to the sheets as a background to aid in aligning the sheets.

15. The method of claim 8, wherein the construction elements comprise portable furniture.

16. A method of installing temporary construction elements for an event without damaging a floor, the method comprising the steps of:

creating a digital file of an architectural template illustrating the temporary construction elements;

printing the digital file as a full-scale architectural template on one or more sheets, each sheet being a portion of the full-scale template, the sheets having markings indicating the position of the temporary elements for the event, each sheet having identifiers and grid lines as a background to the markings to aid in aligning the sheets;

placing and aligning the sheets on the floor so that the identifiers and the grid lines of adjacent sheets align;

attaching the sheets to the floor;

then installing the temporary construction elements on the sheets in accordance with the markings;

then removing the sheets, and then removing the temporary construction elements.

17. The method according to claim 16, wherein the sheets are made of one or more of a vinyl material, a plastic material and a fabric.

18. The method according to claim 16, wherein the sheets are removed by pulling the sheets out from under the temporary construction elements.

19. The method according to claim 16, wherein placing the sheets on the floor comprises securing the sheets together so that a portion of the sheets overlap.

\* \* \* \* \*